United States Patent
Wesselkamper

(10) Patent No.: US 10,027,492 B1
(45) Date of Patent: Jul. 17, 2018

(54) METHOD OF AND CIRCUIT FOR GENERATING A PHYSICALLY UNCLONABLE FUNCTION

(71) Applicant: Xilinx, Inc., San Jose, CA (US)

(72) Inventor: James D. Wesselkamper, Albuquerque, NM (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/633,321

(22) Filed: Jun. 26, 2017

(51) Int. Cl.
- *H04L 9/32* (2006.01)
- *H03K 19/003* (2006.01)
- *G11C 29/52* (2006.01)
- *G11C 29/06* (2006.01)
- *G11C 11/41* (2006.01)

(52) U.S. Cl.
CPC ............ *H04L 9/3278* (2013.01); *G11C 11/41* (2013.01); *G11C 29/06* (2013.01); *G11C 29/52* (2013.01); *H03K 19/003* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 2008/0140363 A1* | 6/2008 | Lin | ............. | G01R 31/3008 703/2 |
| 2017/0077046 A1* | 3/2017 | Gupta | ............. | H01L 23/576 |

* cited by examiner

*Primary Examiner* — Jany Richardson
(74) *Attorney, Agent, or Firm* — John J. King

(57) ABSTRACT

A method of generating a physically unclonable function is described. The method comprises calculating a total variation associated with differences between a plurality of elements of an entropy source in an integrated circuit; calculating a global variation associated the plurality of elements of the entropy source; generating a local variation by removing the global variation associated with the plurality of elements from the total variation; and generating a unique signature based upon the generated local variation. A circuit for generating a physically unclonable function is also described.

20 Claims, 4 Drawing Sheets

METHOD OF AND CIRCUIT FOR GENERATING A PHYSICALLY UNCLONABLE FUNCTION

TECHNICAL FIELD

The present invention relates generally to integrated circuit devices, and in particular, to a method of and circuit for generating a physically unclonable function.

BACKGROUND

Encryption systems are used in a variety of applications, and prevent sensitive data from being compromised. Encryption systems often rely upon a key or other secure value that is used to encrypt data or otherwise prevent access to data by an unauthorized user. Entropy is a measure of randomness in a system, where a high level of entropy associated with a value used to generate a key or other secure value can be significant in an encryption system or any system requiring a random value. A physically unclonable function (PUF) is one type of system generating a random number. A PUF enables providing a unique signature or fingerprint for a given integrated circuit. This signature or fingerprint is different from device to device, where the different devices may include die from the same wafer. A useful PUF provides stable uniqueness without bias or aging effects. This uniqueness may be based upon physical variations to produce differences between circuit elements.

Accordingly, methods and circuits that improve the security of values used in a secure system are beneficial.

SUMMARY

A method of generating a physically unclonable function is described. The method comprises calculating a total variation associated with differences between a plurality of elements of an entropy source in an integrated circuit; calculating a global variation associated the plurality of elements of the entropy source; generating a local variation by removing the global variation associated with the plurality of elements from the total variation; and generating a unique signature based upon the generated local variation.

A circuit for generating a physically unclonable function is also described. The circuit comprises a plurality of circuit elements of the entropy source in an integrated circuit; and a processor configured to calculating a total variation associated with differences between a plurality of elements of an entropy source in an integrated circuit; and calculating a global variation associated the plurality of elements of the entropy source; wherein the processor generates a local variation by removing the global variation associated with the plurality of elements from the total variation, and generates a unique signature based upon the generated local variation.

Other features will be recognized from consideration of the Detailed Description and the Claims, which follow.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
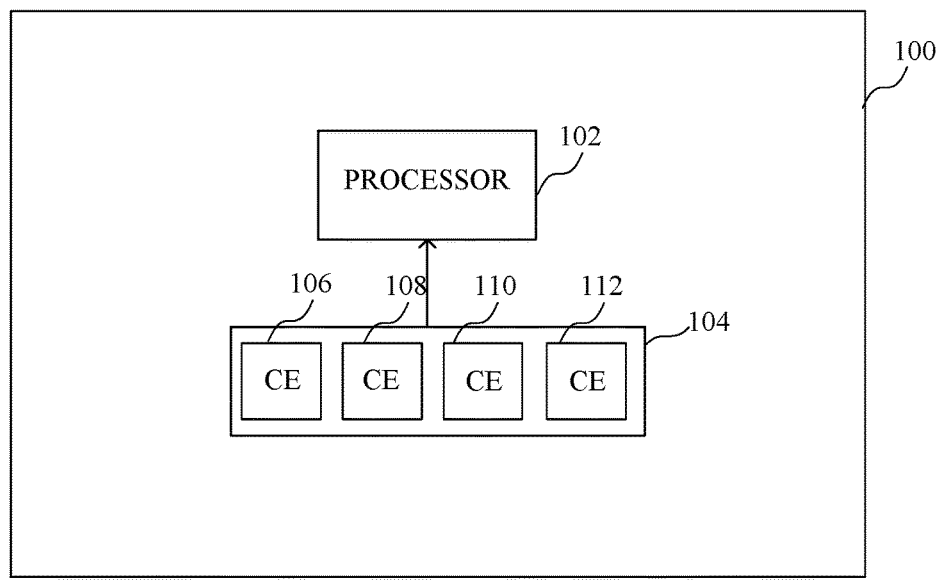
FIG. 1 is a block diagram of an integrated circuit having an entropy source.

Turning first to FIG. 1, a block diagram of an integrated circuit 100 having an entropy source is shown. The integrated circuit 100 comprises a processor 102 and an entropy source 104 having a plurality of circuit elements (CEs), shown here as CE 106, CE 108, CE 110, and CE 112. The circuit elements of FIG. 1 enable the generation of a physically unclonable function (PUF) that provides a unique signature or fingerprint for a given integrated circuit. This signature or fingerprint is different from device to device, where the devices may include die from the same wafer. A useful PUF provides stabile uniqueness without bias or aging effects. This uniqueness may be based upon physical variations of the integrated circuit device to produce differences between elements. Each of the circuit elements generates a component value to be used to generate a unique signature or fingerprint, as will be described in more detail in reference to FIG. 2. According to one implementation, one or more of the circuit elements could comprise a PUF.

Figure 2:
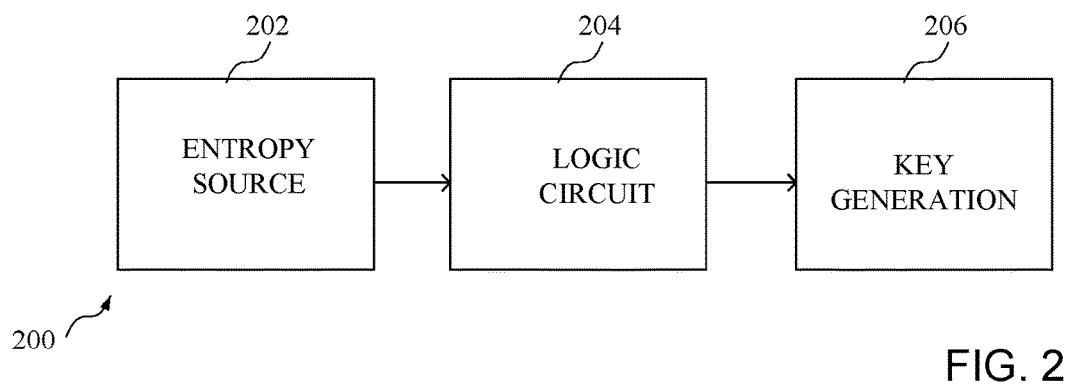
FIG. 2 is a block diagram of circuits enabling the generation of a unique signature.

Turning now to FIG. 2, a block diagram of a circuit 200 enabling the generation of a unique signature is shown. More particularly, an entropy source 202, which may be implemented as entropy source 104 of FIG. 1, is configured to provide values to a logic circuit 204, which may be a PUF logic circuit for example. The values may comprise a population of random numbers or measurements. The logic circuit 204 provides values to a key generation circuit 206, which may be used for generating secure values or keys. The entropy source 202 may comprise an analog section that creates values having variation (i.e. the PUF entropy). A digital section, such as the logic circuit 204, collects the values having variation from the analog section, and may process the values by formatting the values and adding error correction for example. The data generated by the logic circuit 204 may then be used by the key generation circuit 206 to generate a unique signature or key. The key may be generated for example using a one-way function, such as a SHA hashing algorithm for example.

For the entropy source 202 to fulfill a security objective, it is necessary that the generation of values be unpredictable. That is, the entropy source of an analog section must have high entropy. The information from the analog section can come from voltages, currents or other measurable values that naturally vary within an integrated circuit device, such as from a complementary metal oxide semiconductor (CMOS) device. By limiting the values used to generate the PUF to local variation of circuit elements without the influence of global variation, a greater level of unpredictability/entropy can be met.

H(A) is equal to the entropy of the analog section, where A is the output of the analog section. H(A|X_global) is equal to the entropy of the analog section given global information or information not limited to local variation is known, where:

$$H(A|X\_global) \ll H(A).$$

In order to achieve a higher entropy, it is beneficial to use only local variation. Therefore, a determined global variation can be subtracted from overall total variation associated with the output of the analog section to isolate the local variation, which has the highest entropy. An initial output of the analog section is defined as:

$$A = r\_hat, \text{ which was } r\_hat = X\_local(i,n) + X\_global(n),$$

where "i" represents the $i^{th}$ element and "n" represents the $n^{th}$ device. By calculating X_global(n) associated with a global contribution to the entropy, it is possible to define modified outputs of the analog section that are absent any influence from X_global(n) by:

$$A' = r\_hat' = r\_hat - X\_global(n).$$

Therefore, $$H(A'|X\_global) = H(A').$$

That is, X_global does not reveal any information about A'.

According to another implementation using one or more circuit elements of an entropy source such as ring oscillators, directional and magnitude influences can be taken into account. The output of the analog section representing a total variation can be represented by a vector $$r\_hat = (r_0, r_1, \ldots r_n),$$

where $r_x$ represents a variation in a circuit characteristic (e.g., frequency, voltage, etc.) between two circuit elements (e.g., ring oscillators at different locations). Each circuit element may have a specific set of circuit characteristics (e.g., voltage, current, frequency, etc.) that is unique to that circuit element due to manufacturing variations. A difference between circuit elements can then be calculated by comparing their unique circuit characteristic values. $r_x$ is influenced by a local variation $\Delta_n$ and a global variation $\Delta_g$. If the global variation $\Delta_g$ is significant relative to the $\Delta_n$, then differences for each vector component are dominated by $\Delta_g$.

Directional and magnitude influence of $\Delta_g$ on each difference is disclosed by a vector. For example, $(-1, 1, -1, 1, -1 \ldots n) = g\_hat$. The influence of the global variation, described here as a global gradient g_hat, is then $$\text{gradient magnitude} = G = (1/n) \cdot r\_hat * g\_hat.$$

A residual difference or the amount of difference due to local variation can be calculated by $$r\_hat' = (r_0 - G, r_1 - G, r_2 - G, \ldots r_n - G),$$

where each vector element represents a local variation. G_hat is dependent on the PUF design including the physical layout. One example technique for determining g_hat involves performing a linear regression. By relying upon the residual difference in the generation of the PUF, the entropy is maximized. While the example of generating the local variation is provided using a ring oscillator as an example, it should be understood that the local variation can be determined as set forth above for any entropy source, such as any of the entropy sources of FIGS. 5-9 as described below.

Figure 3:
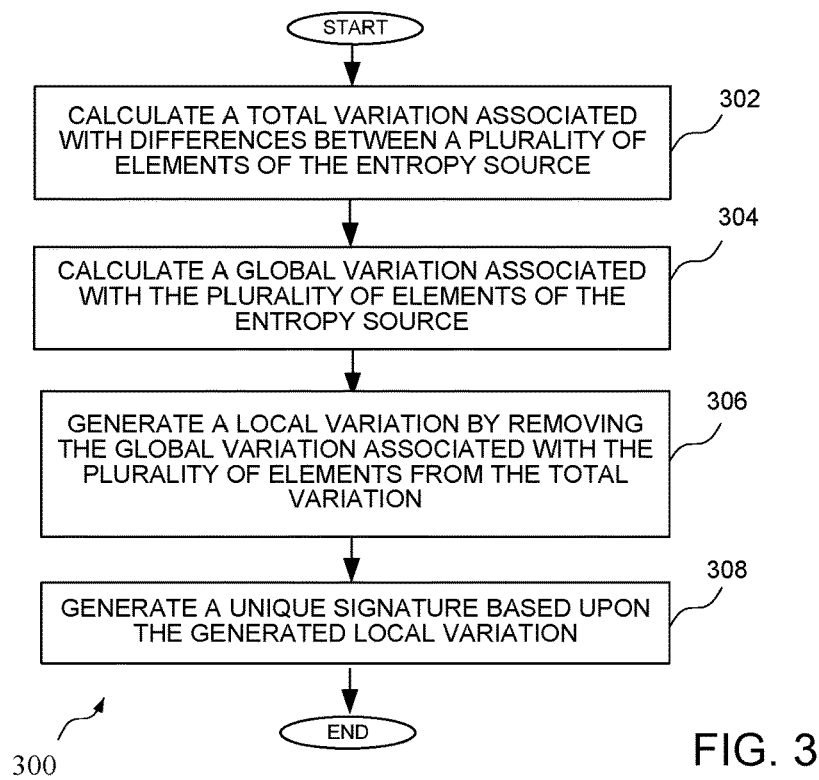
FIG. 3 is a flow chart showing a method of reducing the influence of global variation on an entropy source.

Turning now to FIG. 3, a flow chart 300 shows a method of reducing the influence of global variation on an entropy source in the integrated circuit. A total variation associated with differences between a plurality of elements of the entropy source, such as the circuit elements of FIG. 1, is calculated at a block 302. A global variation associated the plurality of elements of the entropy source is calculated at a block 304, such as by performing a linear regression. A local variation is generated by removing the global variation associated with the plurality of elements from the total variation at a block 306. A unique signature is then generated based upon the generated local variation at a block 308.

The plurality of elements of the entropy source may comprise ring oscillators, as described above. Determining a total variation associated with the plurality of elements of the entropy source may comprise determining variations between values associated with a physically unclonable function generated at predetermined locations of an integrated circuit device. Determining a total variation associated with differences between the plurality of elements of the entropy source may also comprise generating a vector representing the differences between the plurality of elements of the entropy source. To determine the total variation, circuit characteristics of individual circuit elements can be compared against each other to generate a vector representing differences between all circuit elements used to generate the PUF. For example, frequency response of all ring oscillators distributed across the IC may be compared against each other for generating the total variation vector.

The method may further comprise subtracting, for each vector component of the vector, the gradient magnitude from the vector component. The global variation is initially expressed in vector form, wherein the vector may comprise directional and magnitude values. A global variation magnitude may be generated from the global variation vector and subtracted from each value in the total variation vector to generate a local variation vector.

Figure 4:
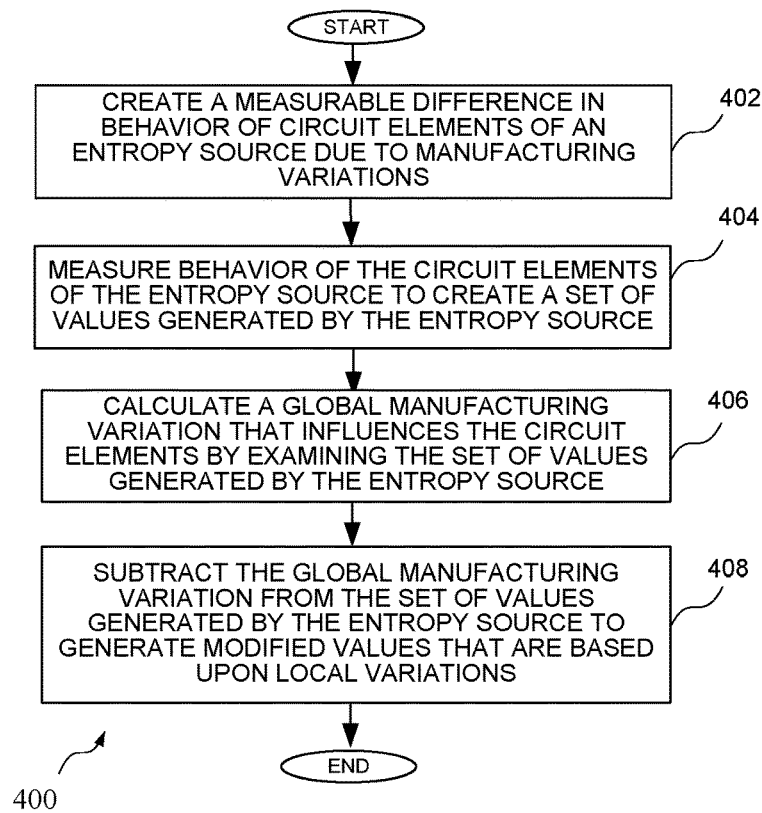
FIG. 4 is a flow chart showing another method of reducing the influence of global variation on an entropy source.

Turning now to FIG. 4, a flow chart 400 shows another method of reducing the influence of global variation on an entropy source. The method of FIG. 4 describes local variation and global variation in terms of manufacturing variations. A measurable difference in behavior of circuit elements of the entropy source is created due to manufacturing variations, where the manufacturing variations represent differences in circuit characteristics, at a block 402. These measurable differences are local variations that may be created using circuit elements in an analog section of the integrated circuit. Behavior of the circuit elements of the entropy source is measured to create a set of values generated by the entropy source at a block 404. A global variation, which may be a result of a global manufacturing variation that influences the circuit elements, is calculated by examining the set of values generated by the entropy source at a block 406. The global manufacturing variation is subtracted from the set of values generated by the entropy source to generate a modified set of values of the physically unclonable function that are based upon local variations at a block 408.

Measuring behavior of the circuit elements of the entropy source may comprise measuring circuit elements of a physically unclonable function generated at predetermined locations of an integrated circuit device. The set of values output from the entropy source may represent the total manufacturing variation of each circuit element of the entropy source. The total manufacturing variation of the plurality of circuit elements may comprise global manufacturing variations that affect more than one element, and local manufacturing variation that affect a single element. The global manufacturing variation may be calculated from a set of discrete values that measures the total manufacturing variation across the plurality of elements. Further, the calculated global manufacturing variation may be subtracted from individual measurement values of the total manufacturing variation for each element, where result of the subtraction is used to create the modified set of values that estimates local manufacturing variation. The modified set of values may be used to generate a unique signature in the digital section, wherein the unique signature has an increased dependency on local manufacturing variation and a reduced dependency on global manufacturing variation. The methods of FIGS. 3 and 4 could be implemented using the circuits of FIGS. 1 and 2 for example or other suitable circuits.

Figure 5:
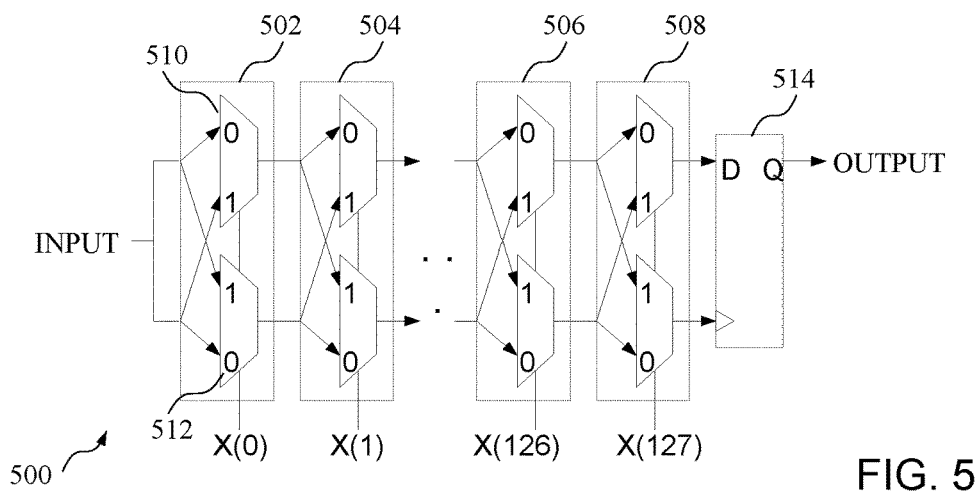
FIG. 5 is a block diagram of an arbiter delay circuit implemented as an entropy source.

Turning now to FIG. 5, a block diagram of an arbiter delay circuit 500 implemented as an entropy source is shown. The arbiter delay circuit comprises a plurality of stages 502-508, where each stage has a pair of multiplexers 510 and 512 and an output is coupled to a register 514. An input signal is routed through the stages in response to multiplexer control signals X[127:0] to generate an output signal. The PUF can be based upon the input signal and detected output signal generated in response to the multiplexer control signals. A PUF may be generated by placing arbiter delay circuits at predetermined locations on the IC. The local variation associated with the outputs of a plurality of arbiter delay circuits can be determined by determining the global variation associated with the plurality of arbiter delay circuits, and subtracting, for each arbiter delay circuit, the global variation. The variations represent differences in circuit characteristics of the arbiter delay circuits. According to some implementations, the local variation can be determined by generating a vector representing a total variation associated with the differences between the plurality of arbiter delay circuits and generating a vector representing a global gradient for the plurality of arbiter delay circuits. A gradient magnitude associated with the global gradient can be calculated and subtracted from each vector component of the vector representing a total variation to determine a local variation for each arbiter delay circuit. The local variation of each arbiter delay circuit can then be used to generate the PUF.

Figure 6:
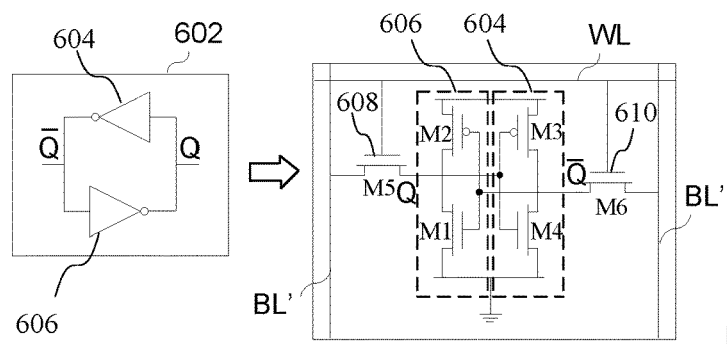
FIG. 6 is a block diagram of memory element implemented as an entropy source.

Turning now to FIG. 6, a block diagram of memory element implemented as an entropy source is shown. The memory elements of FIG. 6 comprise a static random access memory (SRAM) having inverters 404 (having transistors M3 and M4) and 406 (having transistors M1 and M2) configured to generate signals Q and Q_bar as shown. The inverters 604 and 606 can be implemented as a complementary metal oxide semiconductor (CMOS) inverter, where inverter 604 comprises a p-channel transistor M3 and an n-channel transistor M4 and inverter 606 comprises a p-channel transistor M1 and an n-channel transistor M2.

Access transistors 608 and 610, designated at transistors M5 and M6, also provide access to the nodes generating Q_bar and Q.

The SRAM 602 includes bit lines BL' and BL and a word line WL. The SRAM includes stored values Q' and Q. Some of the transistors, e.g., $M_1$ and $M_4$, are referred to as pull-down transistors and some of the transistors, e.g., $M_2$ and $M_3$, are referred to as pull-up transistors. Ideally, the pull-up transistors $M_2$ and $M_3$ should be identical P-channel devices and pull-down transistors $M_1$ and $M_4$ should be identical N-channel devices. Access transistors $M_5$ and $M_6$ should also be identical and the layout of the memory cell should balance capacitances on the Q ad Q' nodes. However, in actuality each transistor $M_1$-$M_6$ varies slightly due to uncontrollable factors during the manufacturing process, such as for example, dopant concentrations. Variations in the relative threshold voltages of the transistors $M_1$-$M_6$ cause each cell to tend toward a natural value of 1 or 0 when power is applied initially. The more closely matched the threshold voltages are, the more influence noise or external signals will have over the natural output, possibly causing the bit of the SRAM 602 to flip.

The variations represent differences in circuit characteristics of the memory elements. The local variation associated with the outputs of a plurality of memory elements can be determined by determining the global variation associated with the plurality of memory elements, and subtracting, for each memory element, the global variation. The variations represent differences in circuit characteristics of the memory elements. According to some implementations, the local variation can be determined by generating a vector representing a total variation associated with the differences between the plurality of memory elements and generating a vector representing a global gradient for the memory elements. A gradient magnitude associated with the global gradient can be calculated and subtracted from each vector component of the vector representing a total variation to determine a local variation for each memory element. The local variation of each memory element can then be used to generate the PUF.

Figure 7:
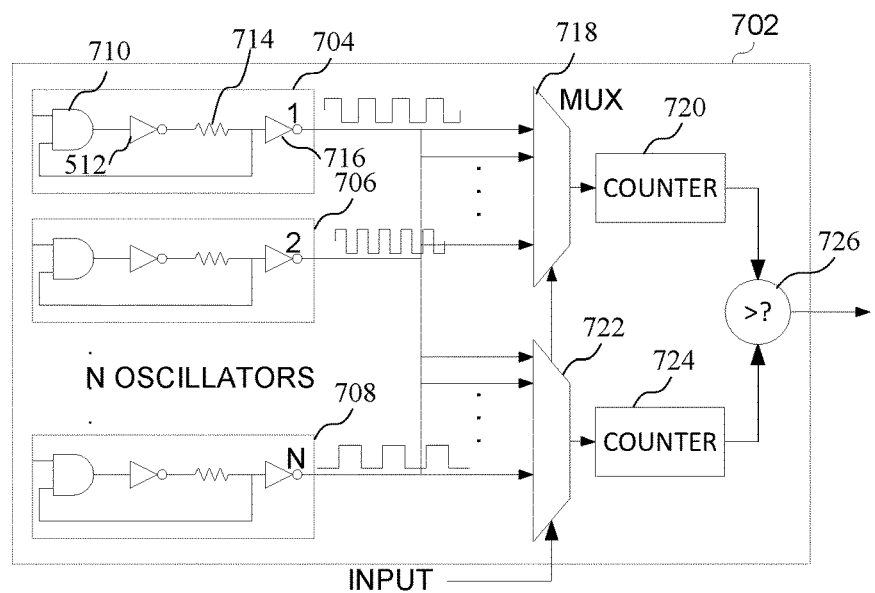
FIG. 7 is a block diagram of a ring oscillator implemented as an entropy source.

Turning now to FIG. 7, a block diagram of a ring oscillator 702 implemented as an entropy source is shown. The ring oscillator comprises a plurality of oscillators 704-708, wherein each oscillator comprises an AND gate 710, an inverter 712, a resistor 714 and an inverter 716 coupled in series, and has a feedback to the AND gate to generate an oscillating output. As shown in FIG. 7, the outputs vary due to variations in the circuit elements, such as transistors of the AND gates and inverters. The oscillators 704-708 could be implemented at different locations of the IC, and may be distributed throughout the integrated circuit to increase entropy. A first multiplexer 718 is coupled to receive the output of each is oscillator, an output of which is coupled to a counter 720. A second multiplexer 722 is also coupled to receive the output of each is oscillator, where an output of the second multiplexer is coupled to a second counter 724. The outputs of the counter are coupled to a comparator 726. By varying the input signal to the multiplexers, different outputs can be selected by the multiplexers to generate different counts and therefore different outputs of the comparator. The PUF can be represented by the output of the comparator 726 based upon the input signal controlling the multiplexers.

The local variation associated with the outputs of a plurality of ring oscillators can be determined by determining the global variation associated with the plurality of ring oscillators, and subtracting, for each ring oscillator, the global variation. According to some implementations, the local variation can be determined by generating a vector representing a total variation associated with the differences between the plurality of ring oscillators and generating a vector representing a global gradient for the plurality of ring oscillators. A gradient magnitude associated with the global gradient can be calculated and subtracted from each vector component of the vector representing a total variation to determine a local variation for each ring oscillator. The local variation of each ring oscillator can then be used to generate the PUF.

Figure 8:
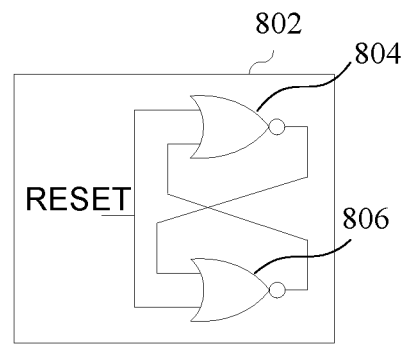
FIG. 8 is a block diagram of a latch cell implemented as an entropy source.

Turning now to FIG. 8, a block diagram of a latch cell 802 implemented as an entropy source is shown. The latch cell 802 comprises a pair of cross-coupled exclusive OR (XOR) gates 804 and 806 as shown. he local variation associated with the outputs of a plurality of latch cells can be determined by determining the global variation associated with the plurality of latch cells, and subtracting, for each latch cell, the global variation. According to some implementations, the local variation can be determined by generating a vector representing a total variation associated with the differences between the plurality of latch cells and generating a vector representing a global gradient for the plurality of latch cells. A gradient magnitude associated with the global gradient can be calculated and subtracted from each vector component of the vector representing a total variation to determine a local variation for each latch cell. It should be noted that the variations represent differences in circuit characteristics of the latch cells. The local variation of each latch cell can then be used to generate the PUF.

Figure 9:
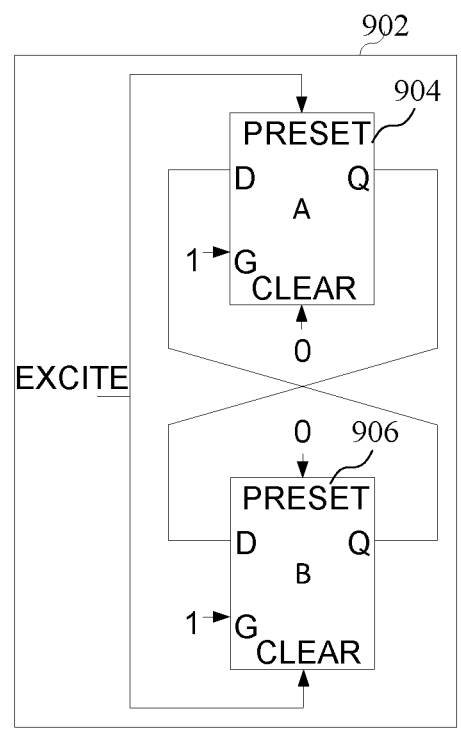
FIG. 9 is a block diagram of a butterfly cell implemented as an entropy source.

Similarly, a butterfly cell 902 implemented as an entropy source is shown in FIG. 9, wherein variations between the butterfly cells represent differences in circuit characteristics of the butterfly cells. The butterfly cell 902 as shown in FIG. 9 comprises a pair of cross-coupled latches 904 and 906, which generate output signals Q and Q_bar in response to the excite signal. The local variation associated with the outputs of a plurality of butterfly cells can be determined by determining the global variation associated with the plurality of butterfly cells, and subtracting, for each butterfly cell, the global variation. According to some implementations, the local variation can be determined by generating a vector representing a total variation associated with the differences between the plurality of butterfly cells and generating a vector representing a global gradient for the plurality of butterfly cells. A gradient magnitude associated with the global gradient can be calculated and subtracted from each vector component of the vector representing a total variation to determine a local variation for each butterfly cell. The local variation of each butterfly cell can then be used to generate the PUF.

It can therefore be appreciated that new methods of and circuits for reducing the influence of global variation on an entropy source have been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A method of generating a physically unclonable function, the method comprising:
calculating a total variation associated with differences between a plurality of elements of an entropy source in an integrated circuit;
calculating a global variation associated with the plurality of elements of the entropy source;
generating a local variation by removing the global variation associated with the plurality of elements from the total variation; and
generating a unique signature based upon the generated local variation.

2. The method of claim 1 wherein calculating a total variation associated with differences between the plurality of elements of an entropy source comprises calculating measurable differences due to manufacturing variations in the integrated circuit.

3. The method of claim 1 wherein calculating a total variation associated with differences between a plurality of elements of an entropy source comprises generating a vector representing the differences between the plurality of elements of the entropy source.

4. The method of claim 3 wherein calculating a global variation comprises generating a vector representing a global gradient.

5. The method of claim 4 wherein the vector representing a global gradient comprises directional and magnitude values.

6. The method of claim 4 further comprising generating a gradient magnitude associated with the global gradient, wherein generating a local variation comprises subtracting, for each vector component of the vector representing the differences between the plurality of elements of the entropy source, the gradient magnitude from the vector component.

7. The method of claim 1 wherein the plurality of elements of the entropy source comprises a plurality of ring oscillators at predetermined locations of the integrated circuit device.

8. The method of claim 7 wherein calculating a total variation comprises generating a vector representing the differences between the plurality of ring oscillators.

9. The method of claim 8 wherein calculating a global variation comprises generating a vector representing a global gradient.

10. The method of claim 9 further comprising generating a gradient magnitude associated with the global gradient, wherein generating a local variation comprises subtracting, for each vector component of the vector representing the differences between the plurality of ring oscillators, the gradient magnitude from the vector component.

11. A circuit for generating a physically unclonable function, the circuit comprising:
a plurality of elements of an entropy source in an integrated circuit; and
a processor of the integrated circuit configured to calculate a total variation associated with differences between the plurality of elements of the entropy source and to calculate a global variation associated the plurality of elements of the entropy source;
wherein the processor generates a local variation by removing the global variation associated with the plurality of elements from the total variation, and generates a unique signature based upon the generated local variation.

12. The circuit of claim 11 wherein the processor calculates a total variation associated with differences between the plurality of elements of the entropy source by calculating measurable differences due to manufacturing variations is the integrated circuit.

13. The circuit of claim 11 wherein the processor calculates a total variation associated with differences between the plurality of elements of the entropy source by generating a vector representing the differences between the plurality of elements of the entropy source.

14. The circuit of claim 13 wherein the processor calculates a global variation by generating a vector representing a global gradient.

15. The circuit of claim 14 wherein the vector representing a global gradient comprises directional and magnitude values.

16. The circuit of claim 14 wherein the processor further generates a gradient magnitude associated with the global gradient, wherein the local variation is generated by subtracting, for each vector component of the vector representing the differences between the plurality of elements of the entropy source, the gradient magnitude from the vector component.

17. The circuit of claim 11 wherein the plurality of elements of the entropy source comprises a plurality of ring oscillators at predetermined locations of the integrated circuit device.

18. The circuit of claim 17 wherein the processor calculates a total variation associated with differences between the plurality of elements of the entropy source by generating a vector representing the differences between the plurality of ring oscillators.

19. The circuit of claim 18 wherein the processor calculates a global variation by generating a vector representing a global gradient.

20. The circuit of claim 19 the processor further generates a gradient magnitude associated with the global gradient, wherein a local variation is generated by subtracting, for each vector component of the vector representing the differences between the plurality of ring oscillators, the gradient magnitude from the vector component.

* * * * *